United States Patent [19]

Järvinen

[11] Patent Number: 5,294,143
[45] Date of Patent: Mar. 15, 1994

[54] TRACTOR EQUIPPED WITH A FIFTH WHEEL

[75] Inventor: Pekka Järvinen, Nummela, Finland

[73] Assignee: Marita Jarvinen Oy, Finland

[21] Appl. No.: 842,397

[22] PCT Filed: Sep. 14, 1990

[86] PCT No.: PCT/FI90/00216
§ 371 Date: Mar. 19, 1992
§ 102(e) Date: Mar. 19, 1992

[87] PCT Pub. No.: WO91/04185
PCT Pub. Date: Apr. 4, 1991

[30] Foreign Application Priority Data

Sep. 25, 1989 [FI] Finland .................... 894504

[51] Int. Cl.⁵ ............................ B62D 53/08
[52] U.S. Cl. ................. 280/425.1; 280/433; 280/438.1
[58] Field of Search ............... 280/425.1, 433, 438.1, 280/434, 436, 441.1, 477

[56] References Cited

U.S. PATENT DOCUMENTS

| | | |
|---|---|---|
| 1,260,027 | 3/1918 | Peets et al. |
| 1,595,902 | 8/1926 | Mayer |
| 2,320,278 | 5/1943 | Johnston ............... 280/438.1 |
| 2,967,721 | 1/1961 | Helton ............... 280/425.1 |
| 3,534,983 | 10/1970 | Alvey ............... 280/425.1 X |
| 3,552,774 | 1/1971 | Gottler ............... 280/425.1 |
| 3,649,047 | 3/1972 | Plantan ............... 280/425.1 X |
| 3,870,342 | 3/1975 | Baxter et al. ............... 280/433 |
| 3,887,251 | 6/1975 | McKay ............... 280/433 X |

FOREIGN PATENT DOCUMENTS

| | | |
|---|---|---|
| 1555970 | 12/1970 | Fed. Rep. of Germany. |
| 2410229 | 9/1974 | Fed. Rep. of Germany. |
| 0009826 | 1/1979 | Japan ............... 280/438.1 |
| 8000330 | 3/1980 | PCT Int'l Appl.. |

*Primary Examiner*—Margaret A. Focarino
*Assistant Examiner*—C. Mattix
*Attorney, Agent, or Firm*—Steinberg & Raskin

[57] ABSTRACT

The present invention relates to a tractor for transferring a variety of trailers and transfer devices (12) equipped with a kingpin (13), which tractor is equipped with a vertically adjustable 5th wheel (4). The 5th wheel (4) comprises gripping members (14, 15) and power mechanisms (16) by means of which the transfer device (12) is by the kingpin (13) with a convenient force pulled into contact with the 5th wheel 4 thus making an inner force balance of the joint 4-12 possible.

15 Claims, 2 Drawing Sheets

TRACTOR EQUIPPED WITH A FIFTH WHEEL

BACKGROUND OF THE INVENTION

The invention relates to a tractor for trailers and devices equipped with a kingpin, used for transferring these in harbours, lorry terminals, industrial plants and elsewhere.

With the development of container transports the need to handle various kinds of trailers, transfer devices and the like has grown substantially at points of departure and destinations and junctions in the traffic. Examples of this include the loading and unloading of semitrailers in roll on-roll off vessels (ro-ro vessels); transfers of semitrailers in lorry terminals, as well as e.g. transfers of swap bodies from points of loading and unloading to stations where transport vehicles are waiting.

Traditionally these operations and transfers are carried out by means of so-called terminal tractors which are two-axle vehicles similar to lorries. These vehicles are expensive and of complicated build, and owing to their great length, less maneuverable. Especially in freight stations and industry's internal transports old tractors removed from actual road traffic have been reconditioned for short-range transfers. The only advantage of these vehicles lies in their relatively low price, in all other aspects they are inferior to the above mentioned terminal tractors.

Patent specification FI 50596 presents the principle of a single-axle tractor equipped with a gooseneck. The vehicle is not directly applicable to the use described here. Patent specification CH 533570 presents a transfer device with a 5th wheel for a semitrailer which transfer device grips the trailer by the kingpin. The device, however, is constructed in such a manner that in practice it is unable to control forces directed to it from the trailer to be transferred, for example forces directed to it upon braking seek to rotate it around the kingpin. The clearances of an ordinary 5th wheel locking and the dynamic shocks they enable damage either the pulling device or the kingpin upon sudden stress and make the transport a risky measure.

SUMMARY OF THE INVENTION

The above drawbacks can be decisively remedied by means of a tractor according to the invention. To achieve this the tractor according to the invention is characterized in that the 5th wheel comprises gripping means and power mechanisms by means of which the device being coupled to the 5th wheel is pressed by its kingpin into contact with the 5th wheel.

The creation of a practical and safe-to-use coupling between a maneuverable, single-axle tractor with low manufacturing costs and a wheeled unit to be transferred can be regarded as the greatest advantage of the present invention.

BRIEF DESCRIPTION OF THE DRAWINGS

In the following the invention is described in detail with reference to the enclosed drawing.

DETAILED DESCRIPTION OF THE INVENTION

Figure 3:
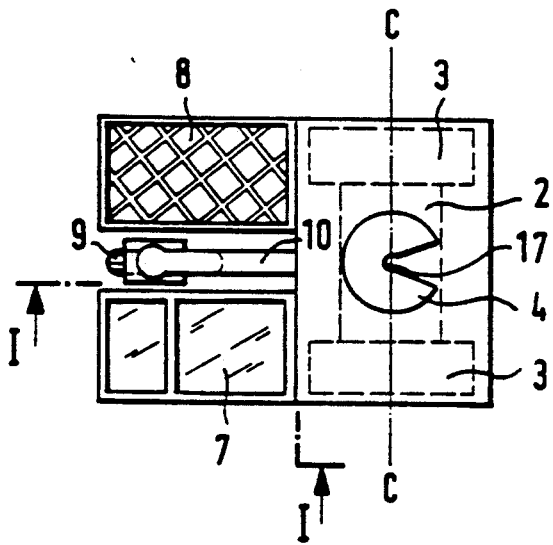
FIG. 3 illustrates a tractor in accordance with the invention seen from above.
Figure 4:
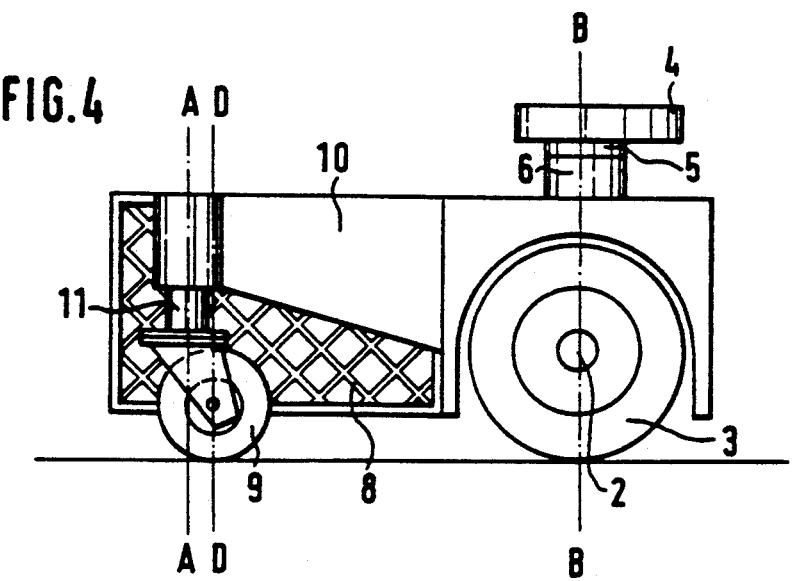
FIG. 4 illustrates a section taken on the line I—I of FIG. 3

A tractor 1 in accordance with the present invention comprises an axle 2 shown in FIGS. 3 and 4 and thereto coupled wheels 3 equipped with hydraulic motors, a 5th wheel 4 coupled to axle 2 in a known manner through a cylinder 6 and possibly a bearing 5, an auxiliary wheel 9 coupled to a supporting structure 10 through cylinder 11, an engine space 8, and a driver's cab 7. The cylinder 6 is fixed to the axle 2 in such a manner that it cannot rotate around the axle 2. The engine space 8 accommodates the motor, a hydraulic pump, tanks and other devices and the driver's cab 7 accommodates the controls of the tractor 1, a bench etc. While the tractor is not coupled into a trailer to be transported or similar, the auxiliary wheel 9 is by means of the cylinder 11 pressed to a supporting position shown in FIG. 4 for the transfer of the tractor 1 in an unloaded state. The auxiliary wheel 9 is of a so-called free rotating type seeking its direction according to the direction where the tractor 1 moves. The 5th wheel 4 may be equipped with the bearing 5 at the point where it is connected to the cylinder 6.

Figure 1:
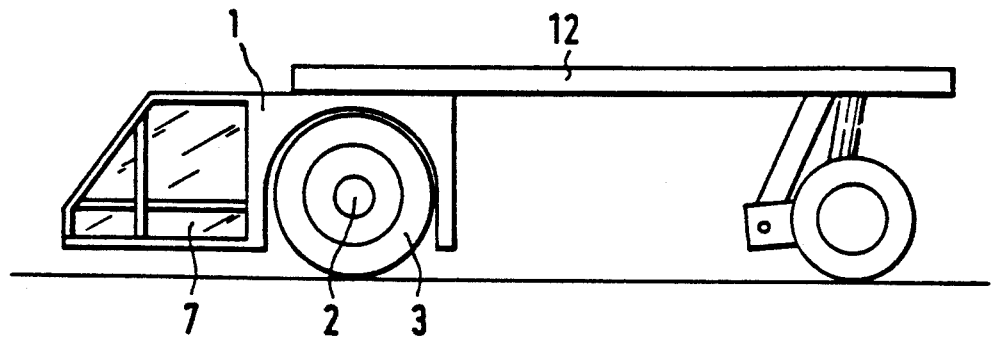
FIG. 1 is a side view of a tractor in accordance with the invention equipped with a transfer device
Figure 2:
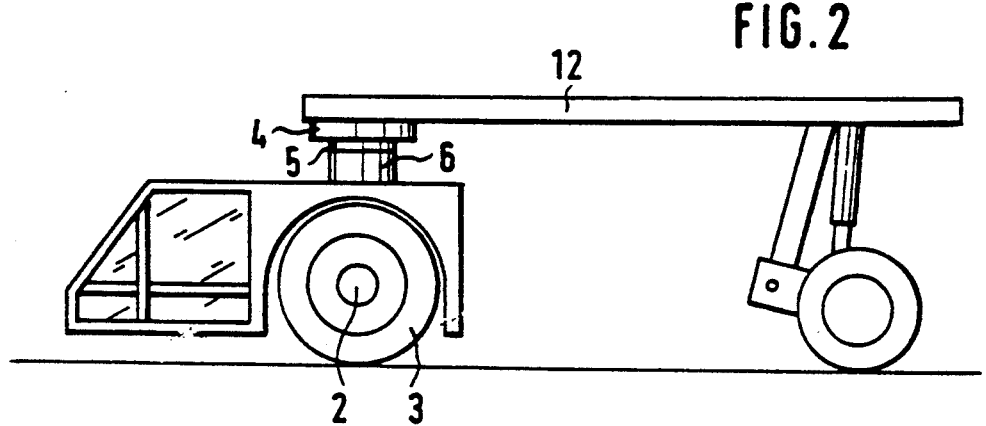
FIG. 2 illustrates the same device as FIG. 1 but with the 5th wheel of the tractor in accordance with the invention in its raised position.

In FIG. 1 a known transfer device 12 has been attached to the tractor 1 through the 5th wheel 4. The transport device 12 is in a lowered position. By adjusting the cylinder 6 conveniently the transport device 12 can be lifted as shown in FIG. 2. The transfer device 12 may be e.g. a lifting wagon for the handling of platforms with legs or it may be a semitrailer or some other device equipped with a known standardized kingpin 13. By regulating the hydraulic motors of the wheels 3 conveniently it is possible to make the tractor 1 turn in relation to the kingpin 13 and thus steer the combination of the tractor and the transfer device 1–12.

Figure 5:
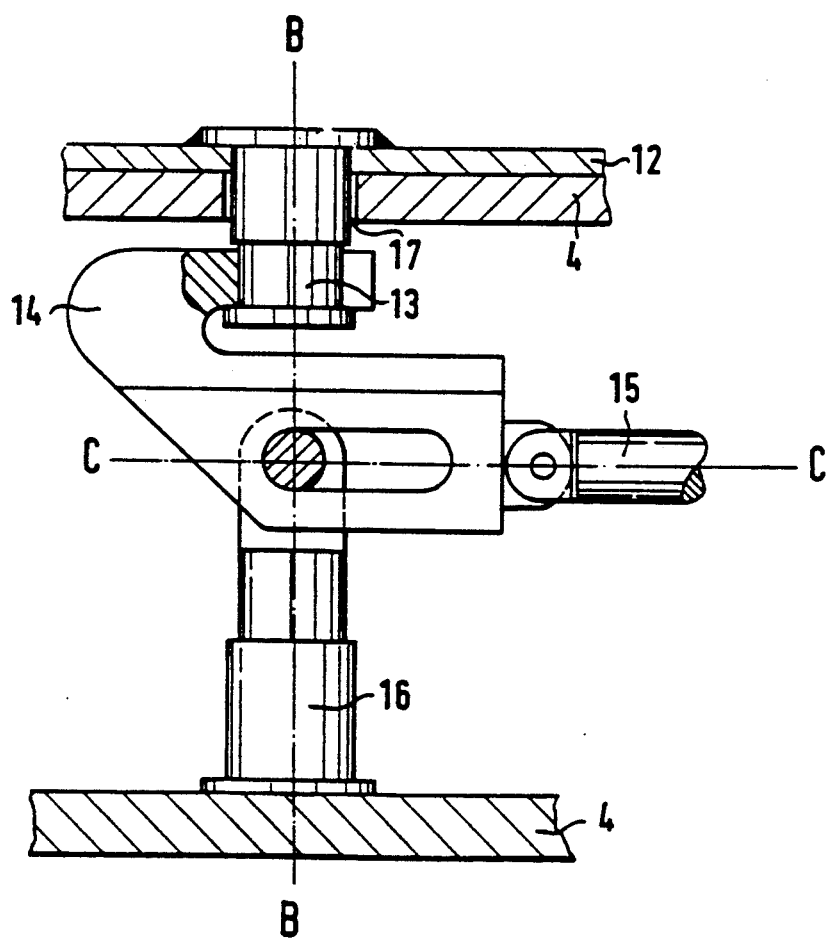
FIG. 5 is a cross-sectional view of the 5th wheel of a tractor in accordance with the invention.

FIG. 5 illustrates a cross-sectional view of the coupling of the tractor 1 and the transfer device 12 shown in FIGS. 1 and 2. The 5th wheel 4 comprises a known aperture 17 or similar, through which the kingpin 13 is guidely directed into the space inside the 5th wheel where there is a fork 14 operated by cylinders 15 and 16. Cylinders 15 and 16 are arranged to move the fork in a horizontal direction and vertical direction, respectively, so that the loop of the fork 14 is capable of gripping the kingpin 13. The fork 14 is used to grip the kingpin 13 in a known manner. The kingpin 13 is by means of the cylinder 16 pressed into contact with the 5th wheel 4. By choosing the force of the cylinder 16 appropriately it is possible to eliminate a substantial part of the forces directed towards the kingpin coupling in a driving situation. If the pulling force of the cylinder 16 is chosen to be equal to the force with which the transfer device 12 bears against the 5th wheel 4, all inner forces produced by acceleration or braking at the coupling point will theoretically be eliminated. The 5th wheel 4 may be equipped with such known sensors by means of which a force concerned at any given time can be determined, and on the basis of this information the force of the cylinder 16 is adjusted to a desired level by means of known devices and methods. The pressing of the 5th wheel 4 against the surroundings of the kingpin 13 of the transfer device 12 upon pulling by means of the cylinder 16 by the kingpin 13 will substantially increase friction at the connecting point. To ensure a smooth turning the joint between the 5th wheel 4 and cylinder 6 may be equipped with a bearing 5 having considerably greater dimensions than a conventional 5th wheel and kingpin combination and thus a better transmission capacity.

It is possible to grip the kingpin 13 in many other ways, too, and not only by means of a fork but also by such known ways of gripping in which the total gripping area of the kingpin 13 is utilized. In addition to the method of pulling directly by means of the cylinder 16 the force acting on the kingpin 13 may also be produced by using different lever and other mechanisms. The 5th wheel 4 may, in addition to the bearing 5, also be equipped with a known spring that always turns an unstressed 5th wheel 4 to the position shown in FIG. 3. On the other hand, the 5th wheel 4 may also be of such construction that the kingpin 13 is coupled substantially in vertical direction and not so much guidedly on lateral level as conventionally. In this case the upper surface of the 5th wheel 4 is rather a level disc having an aperture fit for the kingpin 13 and possibly slightly conic guiding surfaces in the center.

In any case it is to be understood that the invention has above been described with reference to a few preferred embodiments only, however, not wanting to restrict the applications of the invention to these embodiments only, several modifications being possible within the scope of the inventive idea as defined by the following claims.

I claim:

1. A tractor equipped with a 5th wheel for coupling semitrailers and devices to be transferred equipped with a kingpin coupling, comprising:
    a tractor equipped with a power source with controls,
    a vertically adjustable 5th wheel arranged in said tractor, said 5th wheel comprising gripping means for gripping the kingpin of the device being coupled,
    movement means for moving said gripping means in a horizontal direction,
    power mechanisms for moving said gripping means in a vertical direction to thereby press the kingpin of the device being coupled into contact with said 5th wheel.

2. The tractor of claim 1, further comprising a bearing and adjusting means for vertically adjusting said 5th wheel, said adjusting means being connected to said 5th wheel through said bearing.

3. The tractor of claim 1, wherein said gripping means comprise a movable gripping member arranged perpendicularly to an axial direction of the kingpin of the device being coupled.

4. The tractor of claim 1, further comprising an axle having wheels attached thereto, and wherein said gripping means comprise a movable fork arranged substantially in a direction of said axle.

5. The tractor of claim 2, wherein said adjusting means adjust said 5th wheel toward and away from the device being transferred.

6. The tractor of claim 3, wherein said gripping member comprise a fork.

7. The tractor of claim 4, wherein said movable fork has an aperture into which the kingpin of the coupled device is directed.

8. The tractor of claim 4, wherein said movement means comprise a first cylinder connected to said fork, said first cylinder directing said fork in the horizontal direction to grip the kingpin of the coupled device.

9. The tractor of claim 8, wherein said power mechanisms comprise a second cylinder for directing said fork in the vertical direction.

10. The tractor of claim 9, wherein said second cylinder directs the kingpin in a vertical direction into contact with said 5th wheel.

11. The tractor of claim 9, wherein said second cylinder applies a force to said fork after the kingpin is coupled to said 5th wheel such that forces directed to the kingpin when said tractor is moving are substantially eliminated.

12. The tractor of claim 9, wherein said second cylinder applies a force to said fork after the kingpin is coupled to said 5th wheel such that the force applied by said second cylinder is substantially equal to a force of the coupled device against said 5th wheel.

13. The tractor of claim 1, wherein said 5th wheel comprises a level disc having an aperture through which the kingpin of the device being coupled is arranged to enter, said level disc having slight conic guiding surfaces in a central area.

14. A tractor equipped with a 5th wheel for coupling and transferring semitrailers and devices equipped with kingpin couplings, comprising:
    a vertically adjustable 5th wheel coupled to an axle of the tractor through a first adjustable cylinder,
    gripping means for gripping the kingpin coupling of the device being coupled when the kingpin is passed through an aperture in said 5th wheel,
    movement means for moving said gripping means in a horizontal direction, and
    power mechanisms connected to said gripping means for moving said gripping means in a vertical direction to thereby direct said gripping means into contact with the 5th wheel.

15. The tractor of claim 14, wherein said gripping means comprise a fork, said power mechanisms comprise a second adjustable cylinder arranged to direct said fork in the vertical direction and said movement means comprise a third adjustable cylinder arranged to direct said fork in the horizontal direction.

* * * * *